3,189,469
CONCRETE CURING COMPOSITIONS
Frank W. Littler, Mineola, Ernst P. Rittershausen, Hempstead, and Cornelius C. Smith, Lynbrook, N.Y., and Irving P. Hammer, Nutley, N.J., assignors to Socony Mobil Oil Company, Inc., a corporation of New York
No Drawing. Filed Feb. 23, 1961, Ser. No. 90,977
6 Claims. (Cl. 106—12)

This invention is directed to a composition for use as a coating for concrete to retard drying during the curing of the concrete and is particularly directed to a permanent pigmented wax emulsion useful for spray coating on wet concrete roads to provide water retention during the drying and setting of the concrete.

It is well known that a mixture of sand, gravel, water and cement will set to a hard solid material known as concrete. The concrete cures primarily by the reaction of the cement with water to form the agent which binds the sand and aggregate into a hard mass. This reaction requires an extended period for completion. An initial set occurs in a matter of minutes or a few hours, but curing and complete reaction requires several days. Adequate moisture must be present in the mixture during the entire curing period to insure complete reaction of the cement.

If the water evaporates from the setting concrete too rapidly, enough water may not be left to effect full cure, and the concrete may be weak, crumbly and dusty. This effect is of no significant importance in massive concrete structures where the ratio of exposed surface to total volume is small. It is exceedingly important, however, in the case of concrete roads, which are essentially concrete ribbons with a large exposed surface-to-volume ratio. In the setting of concrete roads adequate moisture retention is exceedingly important. If the water evaporates too rapidly, an incompletely cured road results which will not withstand the disintegrating effects of traffic and weather. Road building has become exceedingly expensive and hence rapid breakdown of the highway must be avoided. Traffic on the highway has reached a high level and diversion of this traffic for road repair presents an increasingly complicated problem.

It has been the prior practice to cover the freshly laid concrete with a bed of straw which is kept wet during the curing period. The straw must be wet from time to time, and finally removed, both steps requiring additional labor. As a substitute for straw, plastic film covers have been used and tar paper has been tried. These materials require some means of fastening them to the pavement to prevent their premature removal. They must finally be removed when the curing is complete.

Various painting compounds have been tested for the purpose of retaining moisture in the concrete during curing. These materials have the advantage of not requiring treating during the curing and not requiring removal after the curing is complete. They have been found defective, however, because they are expensive and because they do not have the desired degree of reflectancy. In order to prevent the sun's rays from driving moisture from the concrete, the paint composition must have a high degree of reflectance. Prior paint products have not been sufficiently stable either to give consistently the desired high degree of reflectance, or to preclude the need for considerable mixing or re-mixing just prior to application, or both. Furthermore, breakdown during application by spray machine leading to low or inconsistent degree of reflectance is commonly encountered with compositions heretofore used.

It is, therefore, an object of this invention to provide a stable coating composition which can be readily applied to freshly poured concrete and which will adequately retain moisture in the concrete and provide the required degree of reflectance during the curing of the concrete.

A further object of this invention is to provide a stable, pigment-containing, wax emulsion which can be conveniently sprayed on wet concrete to provide high reflectance and high moisture retention during curing of the concrete.

Another object of this invention is to provide a stable, pigment-containing, wax emulsion which can be applied to freshly laid concrete to form a membranous covering therefor, and which has a reflectance value of at least 60.

These compositions, which are described in detail below, are wax emulsions which are stable during storage, transport, and application and which can be applied to fresh concrete to provide an excellent coating having a high degree of reflectancy. It is generally necessary that the reflectance value of the compositions as determined by the method hereinafter described, be at least 60, in order to be considered as successful concrete curing agents in areas where the concrete is subject to strong sunlight at fairly high atmospheric temperatures.

In order to provide the desired reflectancy and to meet the stability requirements, which contribute significantly to the reflectancy of the compositions of the invention, it is essential that the wax component be finely dispersed and firmly emulsified in the water by a particular class of emulsifying agents, and also that the pigment be finely divided and firmly and evenly dispersed throughout the emulsion in a manner such that the pigment dispersant does not interfere with the wax emulsifier. The nature of the compositions of the invention which meet these requirements and the character of the wax, wax emulsifier, pigment and pigment dispersant will be described in detail. All percentages given are by weight, based on the weight of the final composition.

The wax component is preferably a wax of petroleum origin and includes the types known as paraffin, scale, and microcrystalline waxes and mixtures thereof.

Paraffin wax is the common article of manufacture obtained from petroleum oil by distillation or solvent settling and sold generally as wax cakes having a melting point of about 110–150° F. This wax is made up of high molecular weight hydrocarbons, being generally straight chain compounds having a crystalline structure in solid form. Crude scale wax is the paraffin wax in combination with hydrocarbon oil, such as about 1–10% oil.

Microcrystalline wax is a distinct form of wax obtained from petroleum oil by distillation or fractional crystallization using selected solvents. This material has a melting or softening point of about 150–200° F. and contains a substantial portion of high molecular weight hydrocarbons having branched-chain and ring structures. The material is far more plastic than paraffin wax, being amorphous in form and lacking a well defined crystalline structure. A particularly desirable and the preferred wax component comprises a mixture of scale wax and microcrystalline wax in which the former predominates. The addition of the minor amount of microcrystalline wax yields a more amorphous composition which improves the water retention properties of the composition without adversely affecting the light reflectancy of the composition.

The amount of wax is governed by considerations including consistency, continuity, and emulsifying power of the emulsifying agent in relation to the desired stability of the final composition. Generally the wax is present in an amount of about 15 to about 50%, particularly about 25 to about 40%. Most particularly preferred is about 25 to about 40% of a mixture of scale and microcrystalline wax having a ratio of scale microcrystalline wax of about 2:1 to 3:1.

In order to form a shear stable, and storage stable emulsion of the wax in water, or of the wax and oil in water where the wax contains a small amount of oil, a minor amount of an emulsifier of the class known as soap-type is preferably used. The formation of the emulsion is effected by a procedure such as homogenization. It is essential, however, that this original emulsion be stable to time and to shearing forces and immune from destruction by the presence in it of the pigment and pigment dispersant system.

The suitable emulsifying agents, referred to above as soap-type, are generally considered to include the reaction products of (1) a fatty acid (C12–C22 saturated or unsaturated), a mixture of fatty acids or a fatty material containing such, and (2) an alkali metal base, or an inorganic amine, organic amine, alkanolamine and mixtures thereof.

Typical of the fatty acids are lauric, myristic, palmitic, stearic, behenic, oleic, linoleic and linolenic acids. In addition, mixtures of fatty acids derived from tall oil can be used. Mixtures of fatty acids obtained by hydrolyzing naturally occurring fats and oils from vegetable, animal or marine origin are particularly useful. These fatty acid mixtures may be used "as is" or after hydrogenation. Representative of a hydrogenated mixture is a Hydrofol Acid 51. A typical composition of this acid is:

| | Percent |
|---|---|
| Myristic ($C_{14}$) | 10 |
| Palmitic ($C_{16}$) | 38 |
| Stearic ($C_{18}$) | 25 |
| Arachidic ($C_{20}$) | 17 |
| Behenic ($C_{22}$) | 10 |

Typical of the organic amines utilizable in the compositions of this invention are the aliphatic amines, preferably those having between 1 to 8 carbon atoms. The amines can be primary, secondary or tertiary amines having straight, or branched-chain, or alicyclic groups. Relatively pure compounds can be used, or the amines can be commercial grade. Typical examples are ethyl, propyl, butyl, diethyl and triethylamines. The preferred organic types, however, are the alkanolamines such as mono, di, or triethanolamine. Other useful but non-limiting alkanolamines are 2-amino-2methyl-1-propanol, 2-amino-2-methyl-1, 3 propanediol, methyl ethanolamine, N, N-diethyl ethanolamine and N, N-diisopropyl ethanolamine. Heterocyclic amines such as morpholine can also be used.

The wax emulsifier can be added as such or formed in situ when compounding the emulsion composition. Formation of the emulsifier in situ is preferred for convenience and economy. It is also preferred to use, when the emulsifier is formed in situ, an excess of fatty acid of up to 50% of the stoichiometric amount. The presence of the excess acid in the final composition will, when applied, tend to react with the alkaline concrete so as to form an even more suitable membranous covering.

The amount of wax emulsifier ranges from about 1 to about 10%, and preferably from about 3 to about 7%. Particularly advantageous in forming the preferred embodiment of the invention is the use of about 3 to about 7%, particularly about 3 to about 5% total of Hydrofol fatty acid and triethanolamine in a ratio of acid:amine of about 3:1 to about 3.3:1.

The pigment component raises the reflectance value of a similar composition not containing a pigment. The pigment must be capable of being suspended uniformly, inert to water and unharmed by any excess fatty acid present in the composition. Examples of suitable pigments are calcium carbonate, magnesium carbonate, zinc oxide and titanium dioxide. Titanium dioxide ($TiO_2$) is the preferred pigment for use in the compositions of the present invention because of its high inherent reflectancy.

The amount of pigment present can vary from about 1 to about 10%. The selection of the pigment and amount used will be determined by the reflectance of the pigment itself, the efficiency of the pigment dispersant, the degree of reflectance desired in the emulsion considering also whether it is to be applied in concentrated form or diluted form. A preferred amount of pigment is from about 2 to about 7%, and more particularly, about 4 to about 5%.

The pigment must be dispersed in the emulsion in a manner which precludes its settling out so as to require redispersion just before application. Furthermore, it must be dispersed without ruining the wax emulsion in which it is dispersed. Therefore, it is necessary that the pigment dispersant be compatible with the wax emulsifier. It has been discovered that all these requirements can be met by the use of a nonionic-anionic dispersant system. The terms "nonionic" and "anionic" are well known to the surfacant art and it is in that same sense which they are used herein to distinguish the pigment dispersant system of the present invention from any other system containing either "nonionic" or "anionic" alone, or either one in combination with a "cationic" surface active agent, or the latter alone.

Suitable examples of the anionic type agents utilizable in the compositions of the present invention are potassium tripolyphosphate ($K_5P_3O_{10}$) and selected lecithins. The latter group is preferred, especially soy lecithin, such as "R&R 551 Interface Modifier." Other suitable types are alkali salts of an alkylaryl sulfonic acid typified by "Nacconal NR" and polymerized sodium lignin sulfonates such as "Darvan No. 2."

Of the numerous nonionic surface active agents available, suitable examples are: alkyl aryl polyether alcohols such as "Igepal" CA–630(-iso-octylphenoxy polyoxyethylene ethanol); "Neutronyx" 600(-nonylphenol polyethylene glycol ether); and "Triton X–100" (-t-octylphenoxy polyoxyethylene ethanol). Also suitable are the "Pluronics" which are prepared by condensing ethylene oxide with a hydrophobic base formed by the condensation of propylene oxide with propylene glycol; and the "Tetronic" polyols formed by the sequential addition of propylene and ethylene oxides to ethylene-diamine. A suitable blend of anionic and nonionic surfactants is "Witco 912," which is a blend of polyoxyethylene esters of mono and dicarboxylic acids and oil soluble sulfonates. A suitable phosphate type nonionic agent is "Victawet 12" described as $(RO)PO(OR')_2$ where R is a medium chain alkyl group and R' is a water solubilizing group. Another example of a nonionic agent is "Surfynol TG," which is described as a "mixture of ditertiary acetylenic glycol, alkylphenyl ether of polyethylene glycol and ethylene glycol." A particularly suitable mixture involves about 20% ethylene glycol, about 30% alkyl phenyl ether of polyethylene glycol and about 50% of ditertiary acetylenic glycol.

The nonionic-anionic pigment dispersant blend is present in a minor amount between about 1 to about 3%, preferably between about 1.25% and about 2.0%. Use of at least about 1.25% is particularly desired for overall efficiency of the composition. Use of more than 3% is possible but uneconomical. Also in the dispersant blend it is believed preferable that the anionic predominate. The preferred pigment dispersant system is a combination of the "R. and R. Interface Modifier" and the "Surfynol TG" referred to above in ratio of about 2:1, respectively.

Water, of course, is present and in a principal amount. The water content of emulsions of this invention varies from about 40 to about 75%, and is highest, generally, when the wax content is lowest.

The general procedure for preparing the emulsions of the invention is as follows. The wax and the fatty acid component are melted and heated together in a suitable vessel to about 180° F. The water phase, containing the remaining emulsifier component and dispersants, at about 180° F., is then added to the wax phase at about 180° F. with mixing. The pigment is added, with mixing just prior to homogenization. The complete mixture is then homogenized.

Table I illustrates the effect of varying the composition on the properties of the emulsions of this invention. Examples 2, 3, 5–7 and 9 illustrate the invention, while Examples 1, 4 and 8 are included for comparative purposes. Examples 1–9 were all compounded in accordance with the method described above.

viewed perpendicularly by a normal observer." The test values given in Table I are thus percent reflectances.

The test was performed by the following procedure. Concrete discs about 3¾ inches in diameter and 7/16 inch thick were cast from a dry Portland cement-sand mix ("Sakrete") and water. After the initial set had occurred, i.e., the free water left the surface, about 2 cc. of the emulsion under test was sprayed on the discs. Following air drying at ambient temperature reflectance value was measured using the Hunter multipurpose reflectometer.

The results of the test indicate satisfactory reflectance values for the emulsions of the invention. All were above 60, and many were above 70. A common requirement

TABLE I
*Effect of composition on reflectance and stability*

| Component | Example | | | | | | | | |
|---|---|---|---|---|---|---|---|---|---|
| | 1 | 2 | 3 | 4 | 5 | 6 | 7 | 8 | 9 |
| Scale Wax | 40.0 | 40.0 | 30.0 | 30.0 | 30.0 | 30.0 | 30.0 | 15.0 | 20.0 |
| Microcrystalline Wax | | | 10.0 | 10.0 | 10.0 | 10.0 | 10.0 | 5.0 | 6.7 |
| Titanium Dioxide | 2.0 | 2.0 | 2.0 | 2.0 | 4.0 | 7.0 | 2.0 | 3.5 | 4.7 |
| CaCO$_3$ | | | | | | | 1.0 | | |
| Hydrofol Fatty Acids [1] | | 4.8 | 4.8 | 4.8 | 4.8 | 4.8 | 4.8 | 2.4 | 3.6 |
| Triethanolamine | 1.6 | 1.6 | 1.6 | 1.6 | 1.6 | 1.6 | 1.6 | 0.8 | 1.1 |
| Soy Lecithin [2] | | 1.0 | 1.0 | 0.04 | 1.0 | 1.0 | 1.0 | 0.5 | 1.0 |
| Surfynol TG [3] | | 0.5 | 0.5 | 0.02 | 0.5 | 0.5 | 0.5 | 0.25 | 0.50 |
| Water | 51.6 | 50.1 | 50.1 | 51.54 | 48.1 | 45.1 | 49.1 | 72.55 | 62.40 |
| Reflectance Test Average [4] | 55.9 | 65.0 | 64.5 | <60 | 70.4 | 74.3 | 67.2 | | >60 |
| Stability [5] | Pigment Separated | Good | Good | Separated | Good | Good | Good | Pigment Separated | O.K. |

[1] "Hydrofol Acid HEA 51."
[2] "R&R 551 Interface Modifier."
[3] A mixture of ditertiary acetylenicglycol, alkylphenyl ether of polyethylene glycol and ethyleneglycol.
[4] Method 612.1 of Federal Specification TT-P-141b.
[5] Good means that no settling out of pigment occurred within 30 days.

DISCUSSION OF TABLE I

Example 1 shows that without a pigment dispersant, the pigment separates and the composition has a low reflectance value. This composition is unsatisfactory in both stability and reflectance. Example 2 shows that by the addition of 1.5 percent total pigment dispersant to the composition of Example 1, good stability and reflectance are obtained.

The composition of Example 3 is the same as Example 2 except that a wax blend (scale+microcrystalline) is used. In use this emulsion gave improved water retention with no sacrifice of stability or reflectance.

From a comparison of Example 4 with Example 3 it is seen that reduction of the total amount the pigment dispersant below about 1–1.25 percent, to 0.6 percent particularly in Example 4 seriously and adversely affects storage stability.

Examples 5 and 6 show that increase in pigment (TiO$_2$) content correspondingly increases reflectancy. These compositions also have good stability properties even though in comparison with Example 3, more pigment is present, due to the presence of an adequate amount of total pigment dispersant.

Example 7 demonstrates that a blend of pigments may also be used.

Example 8 shows that 0.75 percent total pigment dispersant is insufficient to disperse effectively and prevent separation of the pigment.

Finally, Example 9 illustrates a composition having good stability and reflectance properties but containing a lesser amount of total wax blend than, e.g., Examples 5 and 6.

The reflectance values shown in Table I were determined in accordance with Method 612.1 entitled "Directional Reflectance" of Federal Specification TT-P-141g, which forms part of Section IV, Part 5 of the Federal Standard Stock Catalog. According to this method, the directional reflectance of a surface is defined as "the daylight reflectance an ideally diffusing specimen would have to have to appear as bright as the test specimen when both are illuminated at 45° by daylight (see method 425.1) and of users of concrete curing agents is a reflectance of at least 60 and white color retention on the surface for seven days which is the normal curing period for concrete. The wax-emulsions of this invention have been found to meet both requirements.

Where less reflectance is required or for considerations of convenience or economy many of the compositions of the present invention can be diluted one or more parts by volume of water and still provide a satisfactory coating when applied.

The stability of the wax emulsions, as indicated in Table I, has been carefully noted both as to storage, transport and during application. No settling out of pigment or breaking of the wax emulsion was encountered over a period of 30 days in most of the emulsions. Slight settling out which was easily reversed by inversion of the container was observed in a minority of the emulsions during this period.

It is to be noted from the results shown in Table I that the compositions of the invention meet, for the first time, the requirements of stability and reflectance needed by those who desire a liquid product concrete curing agent. This has been accomplished by providing for effective dispersion of both wax and pigment, e.g., titanium dioxide, in water, using two distinctly different dispersant combinations, one of which is more effective for wax than for the titanium dioxide, and the other more effective for titanium dioxide than for wax, but neither of which interferes or interacts with the other.

It is to be understood that the above description and examples are illustrative of the preferred embodiments of the invention of which many variations may be made within the scope of the attached claims by those skilled in the art, without departing from the spirit thereof.

We claim:
1. A wax emulsion of high reflectance when applied to a surface and adapted for application to fresh concrete as a curing aid, comprising in combination: about 15–50% by weight of hydrocarbon wax; about 1–10% by weight of the reaction product of (1) at least one fatty material of the grouping consisting of $C_{12}$–$C_{22}$ saturated fatty acids, $C_{12}$–$C_{22}$ unsaturated fatty acids and fatty material containing said acids, and (2) at least one material selected from the group consisting of an alkali metal base and an amine; about 1–10% by weight of a dispersible pigment of high reflectancy; about 1–3% by weight of a pigment dispersant system comprising a mixture of nonionic and anionic dispersants; and the balance water, said combination provided in stable emulsified form so as to provide a reflectancy value of at least 60.

2. The method of curing fresh concrete subject to elevated ambient temperature and solar rays which comprises spraying a coating of the material of claim 1 directly onto the surface of the wet concrete to provide a uniform coating over the concrete surface having a reflectancy value of at least 60.

3. A wax emulsion of high reflectance when applied to a surface and adapted for application to fresh concrete as a curing aid, comprising in combination: about 25–40% by weight of hydrocarbon wax; about 3–7% by weight of the reaction product of (1) at least one fatty material of the grouping consisting of $C_{12}$–$C_{22}$ saturated fatty acids, $C_{12}$–$C_{22}$ unsaturated fatty acids and fatty materials containing said acids, and (2) at least one material selected from the group consisting of an alkali metal base and an amine; about 2–7% by weight of a dispersible pigment of high reflectancy; about 1.25–2.0% by weight of a pigment dispersant system comprising a mixture of nonionic and anionic dispersants; and the balance water, said combination provided in stable emulsified form so as to provide a reflectancy value of at least 60.

4. The method of curing fresh concrete subject to elevated ambient temperature and solar rays which comprises spraying a coating of the material of claim 3 directly onto the surface of the wet concrete to provide a uniform coating over the concrete surface having a reflectancy value of at least 60.

5. A wax emulsion of high reflectance when applied to a surface and adapted for application to fresh concrete as a curing aid comprising in combination: about 30% by weight of hydrocarbon scale wax, about 10% by weight microcrystalline wax, about 2% by weight titanium dioxide, about 4.8% by weight of a mixture of fatty acids in the proportion of about (a) 10% myristic acid, (b) 38% palmitic acid, (c) 25% stearic acid, (d) 17% arachidic acid, and (e) 10% behenic acid, about 1.6% by weight triethanolamine, about 1% by weight lecithin, about 0.5% by weight of a mixture of about (a) 20% ethylene glycol, (b) 30% alkyl phenyl ether of polyethylene glycol and (c) about 50% of ditertiary acetylenic glycol, and the balance water, the said wax being present in homogenized form and the said titanium dioxide being in fully dispersed form in said water, whereby a liquid concrete curing aid is provided with a reflectancy value of at least 60.

6. The method of curing fresh concrete subject to elevated ambient temperature and solar rays which comprises spraying a coating of the material of claim 5 directly onto the surface of the wet concrete to provide a uniform coating over the concrete surface having a reflectancy value of at least 60.

References Cited by the Examiner
UNITED STATES PATENTS

| | | | |
|---|---|---|---|
| 1,930,853 | 10/33 | Kollek | 106—308 |
| 2,928,752 | 3/60 | Felletschin | 106—268 |
| 2,963,765 | 12/60 | Tillman | 106—271 |

MORRIS LIEBMAN, *Primary Examiner.*

JOHN R. SPECK, JOSEPH REBOLD, *Examiners.*